(12) United States Patent
Kordahi et al.

(10) Patent No.: US 8,328,431 B2
(45) Date of Patent: Dec. 11, 2012

(54) COUPLING MULTIPLE CONDUCTOR UNDERSEA OPTICAL CABLES TO AN UNDERSEA DEVICE WITH AN ISOLATED BYPASS CONDUCTIVE PATH ACROSS THE UNDERSEA DEVICE

(75) Inventors: Maurice E. Kordahi, Atlantic Highlands, NJ (US); Robert K. Stix, Red Bank, NJ (US); Tony S. Fong, Manalapan, NJ (US); Jeremiah A. Mendez, Bayville, NJ (US); Steven Bernstein, Jackson, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 341 days.

(21) Appl. No.: 12/697,540

(22) Filed: Feb. 1, 2010

(65) Prior Publication Data
US 2011/0188803 A1   Aug. 4, 2011

(51) Int. Cl.
*G02B 6/38* (2006.01)
*G02B 6/00* (2006.01)
(52) U.S. Cl. .................. 385/55; 385/134; 385/137
(58) Field of Classification Search .......... 385/99
See application file for complete search history.

(56) References Cited

U.S. PATENT DOCUMENTS

| | | | |
|---|---|---|---|
| 5,241,611 A | 8/1993 | Gould | |
| 5,661,842 A | 8/1997 | Faust | |
| 6,870,993 B2 | 3/2005 | Young et al. | |
| 6,895,187 B1 | 5/2005 | Webb | |
| 7,278,789 B2 | 10/2007 | Kordahi | |
| 7,373,054 B2 | 5/2008 | Stix et al. | |
| 7,393,148 B2 | 7/2008 | Allen et al. | |
| 2005/0105164 A1 | 5/2005 | Young et al. | |
| 2007/0269169 A1 | 11/2007 | Stix et al. | |
| 2010/0008666 A1 | 1/2010 | Kovsh et al. | |

OTHER PUBLICATIONS

International Search Report dated Mar. 25, 2011 received in corresponding PCT Application No. PCT/US2011/022869.
Written Opinion dated Mar. 25, 2011 received in corresponding PCT Application No. PCT/US2011/022869.

*Primary Examiner* — Rhonda Peace
(74) *Attorney, Agent, or Firm* — Grossman Tucker Perreault & Pfleger, PLLC (57) ABSTRACT

A multiple conductor optical cable may be coupled to an undersea device, such as a cable joint, branching unit, or repeater, with one or more isolated bypass conductive paths being provided across the undersea device. At least one conductor may be terminated within a housing of the undersea device and at least one conductor may be coupled to a conductive bridge member that provides the isolated bypass conductive path across the device. Multiple conductor optical cables may be coupled to undersea devices in optical networks using independent power paths, for example, to deliver power to different powered components at different voltage potentials.

17 Claims, 6 Drawing Sheets

COUPLING MULTIPLE CONDUCTOR UNDERSEA OPTICAL CABLES TO AN UNDERSEA DEVICE WITH AN ISOLATED BYPASS CONDUCTIVE PATH ACROSS THE UNDERSEA DEVICE

TECHNICAL FIELD

The present invention relates to coupling undersea optical cables and more particularly, to a coupling undersea optical cables to an undersea device with an isolated conductive path across the undersea device.

BACKGROUND INFORMATION

Optical fibers may be used as transmission paths for optical signals in communications networks. Such optical fibers often must extend across many miles and large bodies of water. To protect the optical fibers, particularly in an undersea or submarine environment, the optical fibers may be included in an optical cable that provides many layers of protection. An undersea or submarine optical cable may include, for example, layers of strength members, tubing, a conductor, insulation, shielding, and sheaths depending upon the system environmental conditions.

Optical cables are often coupled to undersea devices such as joints that provide coupling to other cables, repeaters that provide amplification of optical signals, and branching units that provide branching of optical signals. To repair an optical cable, for example, one segment of the optical cable may be coupled to another segment of an optical cable using a cable-to-cable joint such as a universal joint known as a Millennia® Joint (MJ) available from Tyco Electronics Subsea Communications LLC The conductor within an optical cable provides power to electronic equipment within certain types of undersea devices. When joining an optical cable including a conductor, an electrical connection may be made from the cable conductor to another cable conductor (e.g., within a joint) or a powered component (e.g., within a repeater or branching unit).

Certain underwater optical network architectures have created a need for separate conductive paths. For example, an optical network may include different powered components in different network nodes, which are powered with different potentials. A multiple conductor optical cable may be used to provide separate conductive paths, but coupling the optical cables to undersea devices presents unique challenges because conductive paths that are not terminated within an undersea device need to be brought across the device from one side to another. The optical cable should be coupled in a way that isolates the additional conductive path(s) from both the underwater environment and the internal hardware in the device. Moreover, there are difficulties providing an additional isolated conductive path without significantly changing the existing device hardware and coupling process.

BRIEF DESCRIPTION OF THE DRAWINGS

These and other features and advantages will be better understood by reading the following detailed description, taken together with the drawings wherein.

DETAILED DESCRIPTION

A multiple conductor optical cable may be coupled to an undersea device, such as a cable joint, branching unit, or repeater, with one or more isolated bypass conductive paths being provided across the undersea device. At least one conductor may be terminated within a housing of the undersea device and at least one conductor may be coupled to a conductive bridge member that provides the isolated bypass conductive path across the device. Multiple conductor optical cables may be coupled to undersea devices in optical networks using independent power paths, for example, to deliver power to different powered components at different voltage potentials.

As used herein, the terms "couple" or "connect" and variations thereof refer generally to any type of electrical and/or mechanical connection and do not necessarily require a direct physical connection. The term "coupling" as used herein is also not limited to any particular type of undersea device.

Figure 1A:
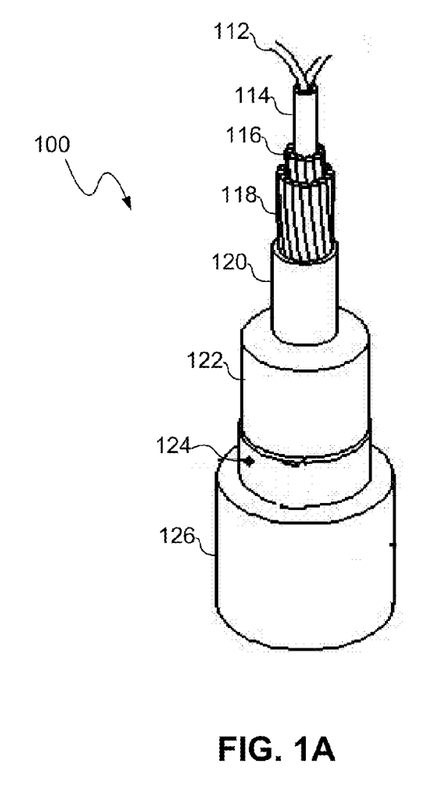
FIG. 1A is a perspective view of a dual-conductor cable, consistent with an embodiment.
Figure 1B:
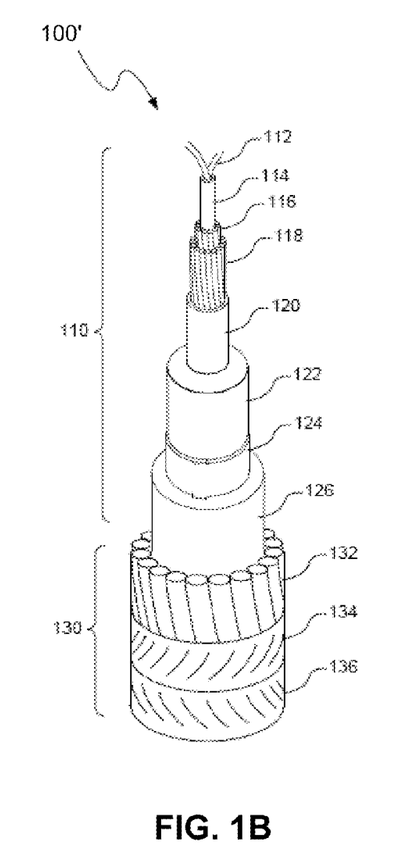
FIG. 1B is a perspective view of an armored dual-conductor cable, consistent with another embodiment.

Referring to FIGS. 1A and 1B, embodiments of dual conductor optical cables 100, 100' are shown and described, which may be coupled to undersea devices with at least one of the conductors coupled to an isolated bypass conductive path across the device. The optical cable 100 may include optical fibers 112 surrounded by a tube 114 and one or more layers of strength members 116, 118 (e.g., wire layers). The optical fibers 112 may include any type of optical fibers capable of carrying optical signals and providing suitable dispersion characteristics, as is known to those skilled in the art. The tube 114 may be made of a polymer such as polycarbonate or polyamide, or a metal such as stainless steel, copper, or aluminum. The tube 114 may also include a gel, such as a thixotropic, water-blockable gel, surrounding the optical fibers 112. The strength members 116, 118 may include first and second layers of high strength steel wires with water-blocking material in the interstices between the wires. In one embodiment, a first layer of strength members 116 may include a plurality of wires and a second layer of strength members 118 may include a plurality of wires of one diameter circumferentially alternating with a plurality of wires of a smaller diameter.

The optical cable 100 includes first and second conductors 120, 124. In this embodiment, the first and second conductors 120, 124 are inner and outer conductive sheaths with inner and outer insulating sheaths 122, 126 insulating the respective conductive sheaths. The conductive sheaths 120, 124 may be made of a conductive material such as copper. The inner conductive sheath 120 may serve as both an electrical conductor within the cable 100 and a hermetic barrier. The insulating sheaths 122, 126 may be polymer sheaths that encapsulate and insulate the respective conductive sheaths.

The optical cable 100' shown in FIG. 1B is an armored cable and includes a core cable portion 110 as described above and an armored portion 130. The armored portion 130 may include one or more layers of armor wire strength members 132 around the outer insulation layer 126 and one or more binder layers 134, 136 around the strength members 132.

The exemplary dual conductor optical cables 100, 100' may be based on the SPA Cable (Special Application Cable) available from Tyco Electronics Subsea Communications LLC such that the dual conductor optical cables may be coupled to an undersea device with minimal or no changes to the hardware and/or coupling process. To make the exemplary dual conductor optical cables 100, 100', the shield layer of the existing SPA cable may be replaced with the outer conductive sheath. Those skilled in the art will recognize that other optical cables including other layers may also be used in accordance with the connection system and method described herein. Although dual conductor optical cables are shown, multiple conductor optical cables with more than two conductors or conductive sheaths may also be used.

Figure 2:
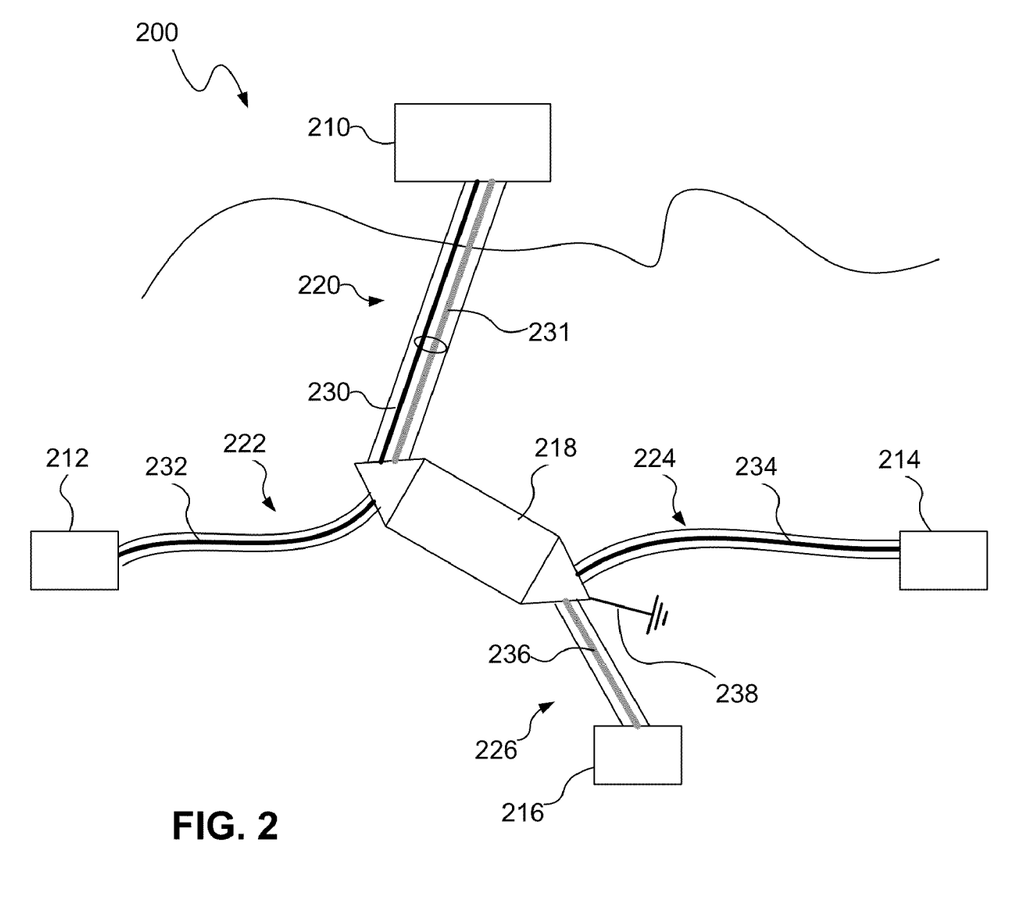
FIG. 2 is a diagrammatic view of an optical network that uses a multiple conductor optical cable to provide independent power paths, consistent with an embodiment.

FIG. 2 shows an embodiment of an optical network 200 with independent power paths. The optical network 200 includes a shore station 210 coupled to nodes 212, 214, 216. In this exemplary embodiment, the node 216 is powered independently of the nodes 212, 214. The nodes 212, 214, for example, may be communication nodes including components that are powered with one voltage potential and the node 216 may be a science node including components that are powered with a different voltage potential. Thus, the optical network 200 is capable of supplying different power levels (e.g., high and low power) over the independent power paths.

An undersea branching unit 218 and optical cables 220, 222, 224, 226 couple the shore station 210 to the nodes 212, 214, 216. In this embodiment, the cable 220 between the shore station 210 and the branching unit 218 is a dual conductor optical cable including two conductors 230, 231 capable of providing independent power paths (e.g., at the two different voltage potentials). The cables 220, 222, 224, 226 are coupled at the branching unit 218 such that the conductor 230 is electrically connected to conductors 232, 234 in the optical cables 222, 224 to the nodes 212, 214 and the conductor 231 is electrically connected to a conductor 236 in the optical cable 226 to the node 216. The conductors 230, 232, 234 may be terminated inside of the branching unit 218, for example, in a conventional manner. The conductors 231, 236 may be coupled to a conductive bridge member that provides an isolated bypass conductive path across (e.g., through or around) the branching unit 218, as will be described in greater detail below.

Thus, three independent power paths are provided—a first path from the station 210 to the node 212 formed by conductors 230, 232, a second path from the station 210 to the node 214 formed by conductors 230, 234, and a third path from the station 210 to the node 216 formed by conductors 231, 236. The first and second power paths to the nodes 212, 214 are at the same voltage potential and the third power path to the node 216 may be at a different voltage potential.

The branching unit 210 may be a four (4) cable branching unit capable of being coupled to four cables. The branching unit 218 may also be coupled to a ground path 238. In the illustrated embodiment, the cables 222, 224, 226 to the nodes 212, 214, 216 may be single conductor cables because only one power path is provided to those nodes. Other variations of an optical network with independent power paths may include additional multiple conductor cables that couple the branching unit to other undersea components, such as other branching units, repeaters, or cable joints, or to nodes that use multiple independent power paths.

Figure 3:
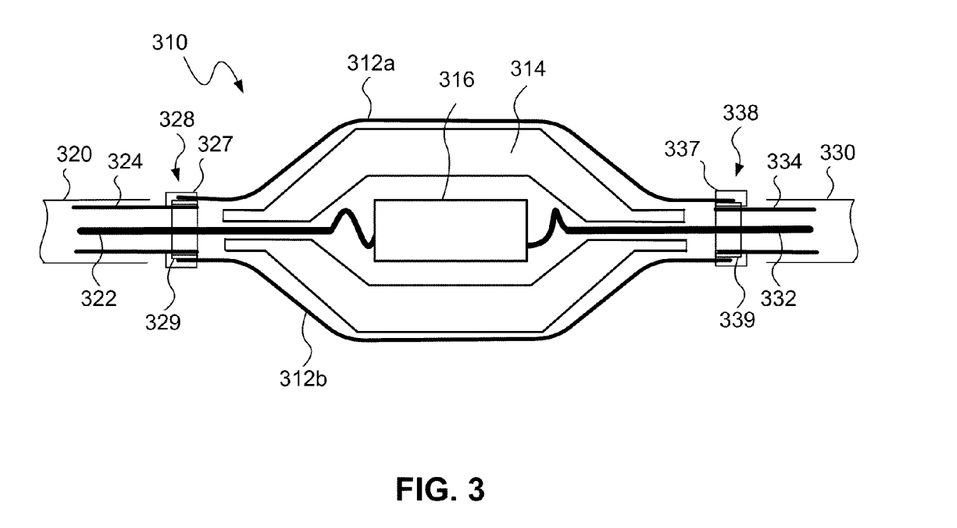
FIG. 3 is diagrammatic view of an undersea device coupled to a dual-conductor optical cable with an isolated conductive path across the device, consistent with an embodiment.

FIG. 3 schematically illustrates an embodiment of an undersea device 310 coupled to multiple conductor cables 320, 330. The undersea device 310 generally includes at least one housing 314 that houses equipment 316. If the undersea device 310 is a branching unit, for example, the equipment 316 may include optical branching equipment such as add/drop multiplexers. If the undersea device 310 is a repeater, the equipment 316 may include optical signal regeneration equipment such as optical amplifiers. If the undersea device 310 is a cable joint, the equipment may include optical coupling equipment such as splice equipment. One example of a joint for providing cable-to-cable coupling is the universal joint available from Tyco Electronics Subsea Communications LLC under the name Millennia® Joint (MJ).

In this embodiment, each of the cables 320, 330 includes an inner conductor 322, 332 and an outer conductor 324, 334, such as the two conductive sheaths in the cables shown in FIGS. 1A and 1B and described above. The cables 320, 330 may be mechanically secured to the undersea device 310 using conventional techniques, for example, the strength members in the cable may be terminated using the existing techniques for terminating strength members. The inner conductors 322, 332 in each of the cables 320, 330 may be terminated to or within the housing 314 of the undersea device 310 using conventional techniques. Terminating the inner conductors 322, 332 includes mechanically and electrically coupling the inner conductors to the housing 314 such that power may be carried through the housing 314 between the conductors 322, 332 and/or to powered components within the housing 314.

The outer conductors 324, 334 in each of the cables 320, 330 may be coupled to one or more conductive bridge members 312a, 312b that pass around and outside of the housing 314. The conductive bridge members 312a, 312b bridge the power path across the undersea device 310 and provide a bypass conductive path that is isolated from the inner conductors 322, 332 and the housing 314 as well as from the outside underwater environment. Both the conductive path through the device 310 and the bypass conductive path may be capable of handling 12 kV. The paths may be powered with the same or different voltage potentials as described above. The conductive bridge members 312a, 312b may include insulated wires. Although two conductive bridge members 312a, 312b are shown coupled to each of the outer conductors 324, 334, a single conductive bridge member or more than two conductive bridge members may also be used.

The one or more conductive bridge members 312a, 312b may be mechanically and electrically coupled to the ends of the outer conductors 324, 334 at connection regions 328, 338. When insulated wires are used as the conductive bridge members 312a, 312b, for example, the wires may be secured or anchored with conductive portions in electrical contact with the outer conductors 324, 334 using an anchoring member 327, 337 such as a crimp member or solder. A conductive ring 329, 339 (e.g., made of copper) may be installed around each of the outer conductors 324, 334 to dissipate any field effects at the ends of the conductors 324, 334 and/or to facilitate securing the conductive bridge members. The rings 329, 339 may be screwed, clamped or soldered onto the respective outer conductors 324, 334. The wires may also be terminated using techniques known for terminating wires to shield layers in optical cables, such as the technique described in U.S. Pat. No. 7,373,054, which is fully incorporated herein by reference. Other techniques, such as soldering, may also be used for mechanically and electrically coupling the conductive bridge members 312a, 312b to the outer conductors 324, 334.

After the outer conductors 324, 334 are coupled to the conductive bridge members 312a, 312b, insulating portions (not shown) may be formed around the connection regions 328, 338 and the exposed portion of the outer conductors 324, 334 at the connection regions 328, 338. The insulating portions restore the insulation around the outer conductors 324, 334 and isolate the bypass conductive path formed by the conductive bridge members 312a, 312b. For example, the exposed portion of the outer conductors 324, 334 at the connection regions 328, 338 may be overmolded either together with the housing 314 and the inner conductors 322, 332 or using a separate molding process, as will be described in greater detail below.

Although the illustrated embodiment shows two dual conductor cables at each end of the undersea device, more than two cables may also be coupled to an undersea device with an isolated bypass conductive path provided across the device (e.g., outside the device housing). For example, a branching unit, such as the type described above, may be coupled to more than two cables. One of the cables coupled to the undersea device may also be a single conductor cable. In a branching unit, for example, one of the cables may be a multiple conductor cable with one conductor terminated inside the branching unit and another conductor coupled to the conductive bridge member(s). Other cables coupled to the branching unit may include a single conductor either terminated inside of the housing or coupled to the conductive bridge member(s).

Figure 4:
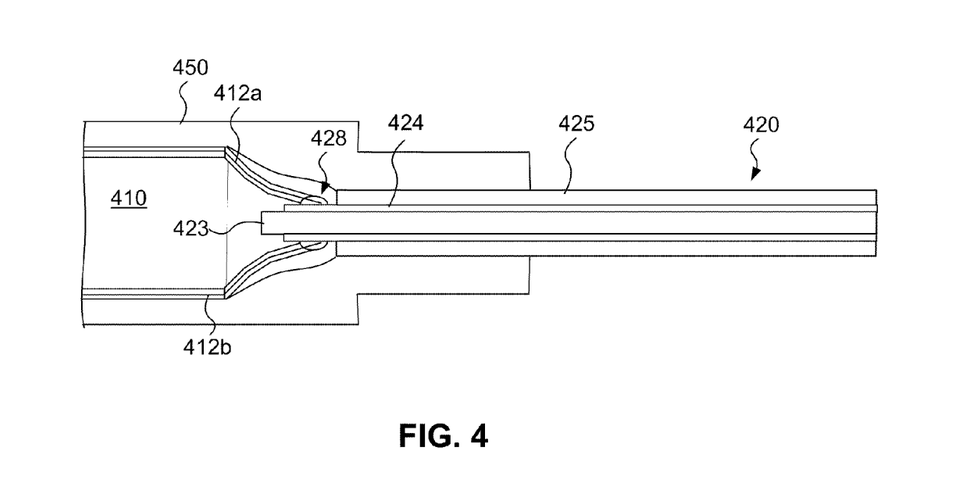
FIG. 4 is a diagrammatic view of a dual-conductor optical cable coupled to an overmolded undersea device with an isolated conductive path provided across the device using a single mold technique, consistent with one embodiment.

According to one method of isolating a bypass conductive path across an undersea device 410, shown in FIG. 4, the bypass conductive path may be overmolded together with the device 410 using a single mold technique. The overmolded undersea device 410 is coupled at one end to a multiple conductor optical cable 420. An inner conductor (not shown) of the optical cable 420 is terminated to the device 410 using known techniques. An outer conductor 424 located between inner and outer insulating layers 423, 425 may be exposed by removing a portion of the outer insulating layer 425. Conductive bridge wires 412a, 412b may be mechanically and electrically coupled at one end to the outer conductor 424 at a connection region 428, for example, using solder, power tape, heat shrink tubes, and/or other attachment or termination methods.

In this embodiment, the connection region 428 is located inside the mold profile of an existing mold cavity 450. The conductive bridge wires 412a, 412b may be embedded in a mold groove such that the outer profile of the mold remains unchanged (e.g., as compared to the undersea device 410 overmolded without the wires 412a, 412b). The conductive bridge wires 412a, 412b may also pass through an insulating sleeve (not shown in FIG. 4) around at least a portion of a housing of the device 410, as described below. The undersea device 410, the wires 412a, 412b, and the connection region 428 may be overmolded at once using a single molding step and a dielectric molding material such as polyethylene. The overmolding forms an insulating portion around the connection region 428 and the exposed portion of the outer conductor 424 at the connection region 428 as well as around the exposed portion of the inner conductor (not shown) terminated to the device 410. Thus, insulation restoration for both the inner and outer conductors in the cable 420 is accomplished using one shot molding.

Figures 5, 5A:
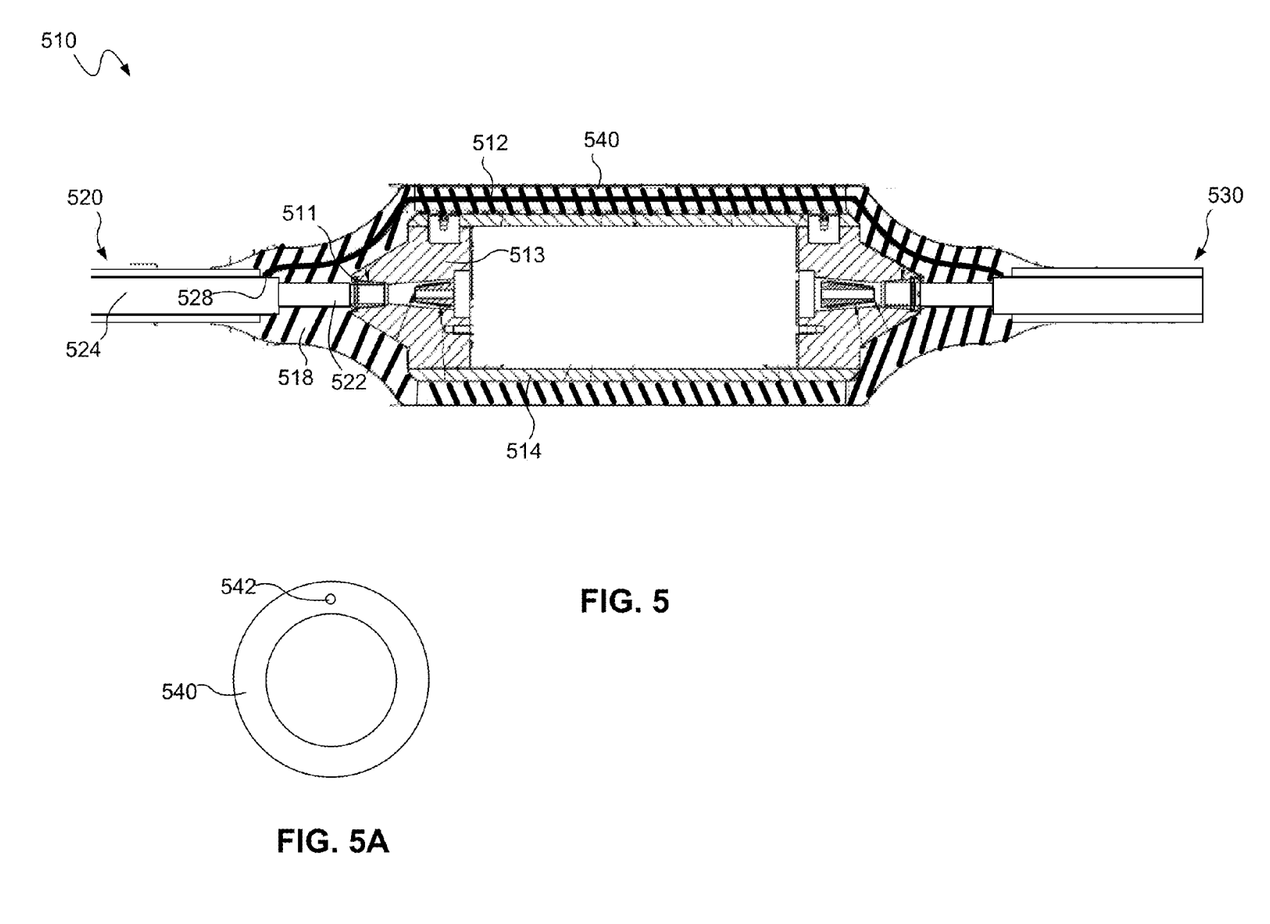
FIG. 5 is a side cross-sectional view of an embodiment of an undersea optical cable joint coupled to dual-conductor optical cables with an isolated conductive path across the cable joint.
FIG. 5A is a side view of an insulating sleeve used in the optical cable joint of FIG. 5 to isolate the conductive path across the cable joint.

FIG. 5 shows an embodiment of an undersea optical cable joint 510 coupled to dual conductor optical cables 520, 530 and overmolded using the single mold technique described above. In this embodiment, the optical cable joint 510 includes an inner housing 514 that contains splice equipment for splicing optical fibers from the optical cables 520, 530. The optical cables 520, 530 may be coupled in the same way at each end of the cable joint 510, and to simplify the description, the coupling of the cable 520 is described in detail.

The optical cable 520 includes an inner conductive sheath 522 and an outer conductive sheath 524. The inner conductive sheath 522 is terminated using known techniques, for example, using a conical termination member 511 that fits around the inner conductive sheath 522 and within a cable socket body 513 at one end of the housing 514. The outer conductive sheath 524 is coupled at connection region 528 to a conductive bridge wire 512 that passes outside of the housing 514, for example, using the attachment or termination techniques described above.

The housing 514, the cable socket body 513, and the end of the cable 520 are overmolded to form an overmolded insulating portion 518, for example, from suitable dielectric moldable materials. The overmolded insulating portion 518 covers the connection region 528 and the termination of the inner conductive sheath 522 and restores the insulation over both the inner conductive sheath 522 and the outer conductive sheath 524, thereby isolating both the inner conductive sheath 522 and the outer conductive sheath 524. In this embodiment, the conductive bridge wire 512 may be passed, prior to overmolding, through an insulating sleeve 540 that extends around the housing 514. The insulating sleeve 540 may be a polyethylene sleeve such as the type used around the housings of existing optical cable joints but with a hole 542, slot, or other similar feature formed therein to receive the conductive bridge wire 512, as shown in FIG. 5A. Thus, the bypass conductive path formed by the conductive bridge wire 512 is isolated from the inner conductive sheath 522 and housing 514 as well as the outside environment. The bypass conductive path formed by the conductive bridge wire 512 may also be located within a profile of the cable joint 510 with minimal modifications to the existing hardware and mold process.

Figure 6:
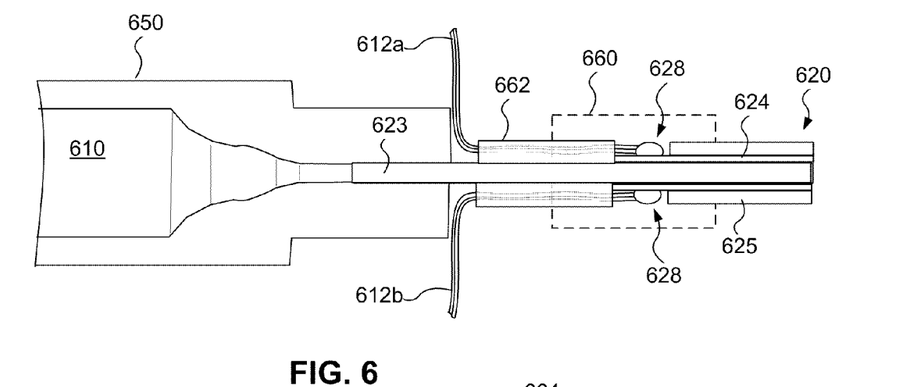
FIG. 6 is a schematic view of a dual-conductor optical cable coupled to an overmolded undersea device using a two mold technique, consistent with another embodiment.
Figure 7:
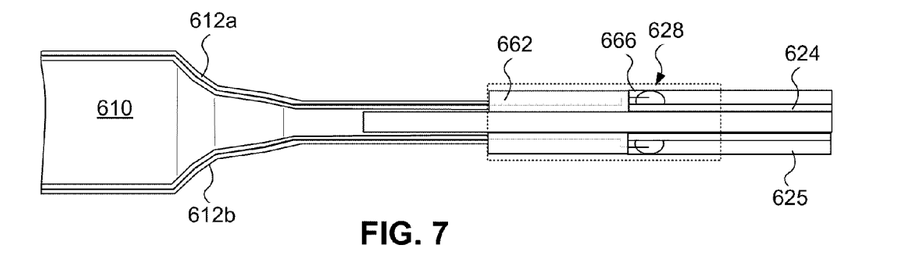
FIG. 7 is a schematic view the overmolded undersea device coupled to the multiple conductor optical cable shown in FIG. 6 after the molding process.

According to another method of isolating a bypass conductive path across an undersea device 610, shown in FIGS. 6-7, the bypass conductive path may be overmolded separately from the device 610 using a two mold technique. The overmolded undersea device 610 is coupled at one end to a multiple conductor optical cable 620. An inner conductor (not shown) of the optical cable 620 is terminated to the device 610 using known techniques. An outer conductor 624 located between inner and outer insulating layers 623, 625 may be exposed by removing a portion of the outer insulating layer 625. Conductive bridge wires 612a, 612b may be mechanically and electrically coupled to the outer conductor 624 at a connection region 628, for example, using solder, power tape, heat shrink tubes, and/or other attachment or termination methods, as described above.

A housing of the device 610 including the termination of the inner conductor may be overmolded within a mold cavity 650, thereby restoring the insulation around the inner conductor terminated to the device 610. In this embodiment, the connection region 628 (e.g., solder connection) is located outside of the mold profile of the mold cavity 650 and an insulating portion is formed around the connection region 628 separately. The insulating portion may be formed around the connection region 628 and an exposed portion of the outer conductor 624 at the connection region 628, for example, using a separate restoration mold cavity 660, such as the type used to provide jacket restoration around optical cables. The restoration molding around the connection region 628 may be performed in parallel with the molding of the device 610. The conductive bridge wires 612a, 612b may be left outside of the mold cavity 650 (as shown in FIG. 6) and thus outside of the overmolded housing of the device 610 (FIG. 7), or the conductive bridge wires 612a, 612b may be overmolded with the device 610 as described above and shown in FIGS. 4 and 5.

Figure 6A:
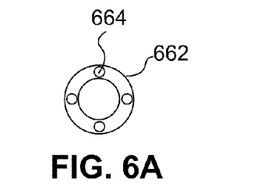
FIG. 6A is a side view of a wire guide used to secure wires coupled to the outer conductor in FIG. 6.

To secure the conductive bridge wires 612a, 612b during the restoration mold process at the connection region 628, a wire guide 662 may be positioned over the inner insulating layer 623 with the wires 612a, 612b passing through the wire guide 662. The wire guide 662 may be a cylindrical sleeve made of a moldable dielectric material with holes 644 formed therein for receiving the respective wires 612a, 612b, as shown in FIG. 6A. Although four holes 644 are shown for receiving four conductive bridge wires, the wire guide may include any number of holes depending upon the desired number of wires or conductive bridge members. The wire guide 662 thus provides strain relief and prevents the conductive bridge wires 612a, 612b from shorting and/or being disconnected at the connection region 628 during the high pressure molding process.

Other techniques may also be used to form an insulating portion around the connection region 628 and the exposed portion of the outer conductive sheath 624 at the connection region instead of or in addition to the restoration mold. For example, a heat shrink sleeve may be heat shrunk around the exposed portion of the outer conductor 624 and the connection region 628.

Figure 8:
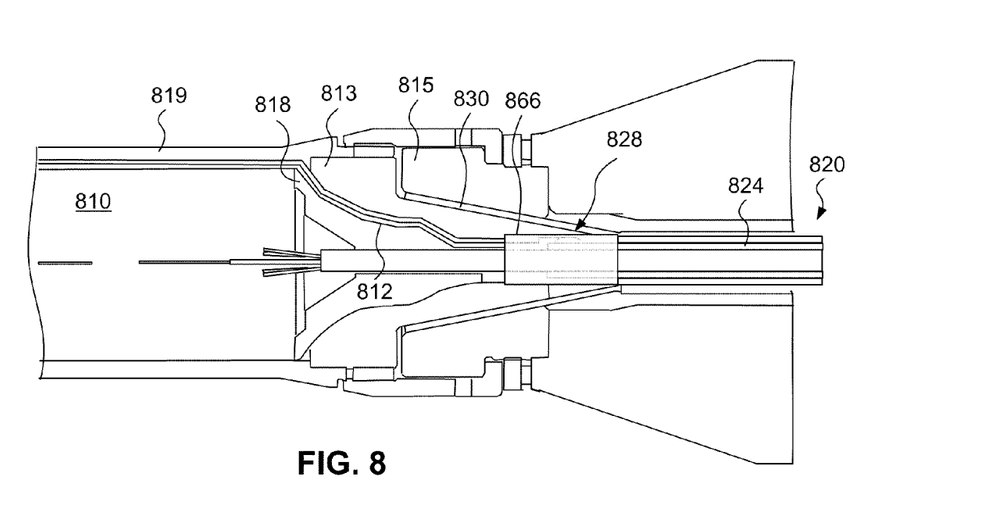
FIG. 8 is a side partially cross-sectional view of an armored dual conductor optical cable coupled to an overmolded undersea device.

FIG. 8 shows an embodiment of an overmolded undersea device 810 coupled to a multiple conductor armored optical cable 820. The armored optical cable 820 includes armor wire strength members 830 that are secured, for example, between an inner tapered member 813 and an outer member 815 of an armored termination assembly. The undersea device 810 and a portion of the optical cable 820 (e.g., the exposed inner conductor) are overmolded with an insulating material 818, for example, as described above. An armor sleeve 819 is located around the overmolded device 810.

Conductive bridge wire 812 is coupled to an outer conductive sheath 824 of the optical cable 820 at a connection region 828. The connection region 828 and exposed portion of the outer conductor 824 may be covered by insulating material 866 formed, for example, by a restoration mold or heat shrink tubing. In this embodiment, a portion of the insulating material 866 and the conductive bridge wire 812 fits within a hole through the tapered member 813 and a groove may be cut in the wedge member 813 to allow the wire 812 to pass between the tapered member 813 and the overmolded portion 818. The wire 812 may also run in a groove in the armor sleeve 819 or a groove cut in the overmolded portion 818 around the molded device 810. Thus, an isolated bypass conductive path may also be provided across an armored cable coupling with minimal modifications to the armor hardware.

Accordingly, the methods of coupling multiple conductor optical cables described herein are capable of establishing an isolated bypass conductive path across an undersea device without having to substantially change the existing hardware and molding processes.

Consistent with an embodiment, a method is provided for coupling optical cables to an undersea device. At least a first one of the optical cables includes at least an inner conductive sheath and an outer conductive sheath and at least a second one of the optical cables includes at least one conductive sheath. The method includes: terminating the inner conductive sheath in the first one of the optical cables within the undersea device; coupling at least one conductive bridge member to the outer conductive sheath of the first one of the optical cables at a first connection region and to the conductive sheath in the second one of the optical cables at a second connection region, wherein the conductive bridge member establishes an isolated bypass conductive path across the undersea device; and forming insulating portions around the connection regions and exposed portions of the conductive sheaths at the connection regions.

Consistent with another embodiment, an undersea optical cable connection assembly includes an undersea device including at least one housing and equipment located within the housing and at least two undersea optical cables coupled to the undersea device. At least a first one of the undersea optical cables includes at least inner and outer conductive sheaths, and at least the inner conductive sheath of the first one of the optical cables is terminated inside of the undersea housing. At least one conductive bridge member is connected to the outer conductive sheath in the first one of the optical cables at a first connection region and to a conductive sheath in the second one of the optical cables at a second connection region. The conductive bridge member establishes an isolated bypass conductive path across the undersea device.

Consistent with a further embodiment, an optical network includes a plurality of nodes, wherein at least a first node includes a powered component that uses power at a first voltage potential and at least a second node includes a powered component that uses power at a first voltage potential. The optical network also includes a plurality of optical cables. At least a first one of the optical cables includes separate conductors for separate power paths at the first and second voltage potentials. At least a second one of the optical cables is coupled to the first node and includes a conductor for providing power at the first voltage potential. At least a third one of the optical cables is coupled to the second node and includes a conductor for providing power at the second voltage potential. The optical network further includes a branching unit coupled to the optical cables. One of the conductors in the first one of the optical cables and the conductor in the second one of the optical cables are terminated within a housing of the branching unit establishing a conductive path at the first voltage potential. A conductive bridge member is coupled to another of the conductors in the second one of the optical cables and to the conductor in the third one of the optical cables establishing an isolated bypass conductive path at the second voltage potential.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of coupling optical cables to an undersea device, wherein at least a first one of the optical cables includes at least a first and second conductive sheaths and at least a second one of the optical cables includes at least one conductive sheath, the method comprising:
   terminating the first conductive sheath in the first one of the optical cables within the undersea device;
   coupling at least one conductive bridge member to the second conductive sheath of the first one of the optical cables at a first connection region and to the conductive sheath in the second one of the optical cables at a second connection region, wherein the conductive bridge member establishes an isolated bypass conductive path across the undersea device; and
   forming insulating portions around the connection regions and exposed portions of the conductive sheaths at the connection regions.

2. The method of claim 1 wherein forming the insulating portions comprises:
   overmolding the undersea device, an exposed portion of the first conductive sheath, and the connection regions and the exposed portions of the conductive sheaths at the connection regions with an insulating material.

3. The method of claim 2 wherein the conductive bridge member is a wire, and further comprising passing the wire through an insulating sleeve located around a housing of the undersea device, and wherein the insulating portion is overmolded with the undersea device.

4. The method of claim 1 further comprising:
   overmolding the undersea device and an exposed portion of the first conductor with a first insulating portion; and
   wherein forming the insulating portion comprises separately overmolding the connection regions and the exposed portions of the conductive sheaths at the connection regions with a second insulating portion.

5. The method of claim 4 wherein the conductive bridge member is a wire, and further comprising passing the wire through wire guides located around the optical cables at each of the connection regions, and wherein the wire guides are overmolded with the connection regions.

6. The method of claim 1 wherein forming the insulating portions comprises:
   heat shrinking the insulating portions around the connection regions and the exposed portions of the conductive sheaths at the connection regions.

7. The method of claim 1 wherein the conductive bridge member is a wire.

8. The method of claim 1 wherein the second one of the optical cables includes first and second conductive sheaths, further comprising terminating the first conductive sheath of the second one of the optical cables within the undersea device, and wherein the second conductive sheath of the second one of the optical cables coupled to the conductive bridge member at the second connection region.

9. The method of claim 1 wherein the undersea device is a device selected from the group consisting of a cable joint, a repeater and a branching unit.

10. An undersea optical cable connection assembly comprising:
    an undersea device including at least one housing and equipment located within the housing;
    at least two undersea optical cables, wherein at least a first one of the undersea optical cables includes at least first and second conductive sheaths providing independent power paths, and wherein at least the first conductive sheath of the first one of the optical cables is terminated inside of the undersea housing; and
    at least one conductive bridge member connected to the second conductive sheath in the first one of the optical cables at a first connection region and to a conductive sheath in the second one of the optical cables at a second connection region, wherein the conductive bridge member establishes an isolated bypass conductive path across the undersea device and bridges one of the power paths across the undersea device from the first one of the undersea optical cables to the second one of the undersea optical cables without coupling the one of the power paths to the equipment located within the housing.

11. The undersea optical cable connection assembly of claim 10, wherein the undersea device is a branching unit including optical branching equipment in the housing.

12. The undersea optical cable connection assembly of claim 10, wherein the undersea device is a repeater including repeater equipment in the housing.

13. The undersea optical cable connection assembly of claim 10, wherein the undersea device is a cable joint including optical coupling equipment in the housing.

14. The undersea optical cable connection assembly of claim 10, wherein the undersea device includes an insulating portion extending around at least a portion of the housing, and wherein the conductive bridge member includes a wire extending through a hole or slot in the insulating portion, and wherein the undersea device including the insulating portion and the wire are overmolded.

15. The undersea optical cable connection assembly of claim 10, wherein the undersea device and the conductive bridge member including the connection regions are overmolded together.

16. The undersea optical cable connection assembly of claim 10, wherein the optical cables include a plurality of optical fibers, a tube holding the optical fibers, and at least one layer of strength members around the tube, at least a first conductive sheath around the strength members, and at least a first insulation sheath around the conductive sheath, wherein the multiple conductor cable includes at least a second conductive sheath around the first insulation sheath and at least a second insulation sheath around the second conductive sheath.

17. The undersea optical cable connection assembly of claim 10, wherein each of the optical cables includes at least a first conductive sheath terminated within the housing of the undersea device and at least a second conductive sheath coupled to the conductive bridge member.

* * * * *